United States Patent [19]
Vaccaro et al.

[11] Patent Number: 5,791,059
[45] Date of Patent: Aug. 11, 1998

[54] METHOD AND APPARATUS FOR MEASURING CIRCUMFERENCE OF TIRE BEADS

[75] Inventors: Michael P. Vaccaro, Rome; Kenneth B. Turvey, Clinton; Christopher L. Johnson, Durhamville; Robert C. Sandore, Rome, all of N.Y.

[73] Assignee: Bartell Machinery Systems, Inc., Rome, N.Y.

[21] Appl. No.: 740,097

[22] Filed: Oct. 24, 1996

[51] Int. Cl.⁶ ........................................... G01B 3/12
[52] U.S. Cl. ................ 33/203; 33/712; 33/772; 33/203.12; 33/555.1
[58] Field of Search ............... 33/203, 712, 772, 33/773, 775, 203.12, 203.13, 542, 544.4, 544.5, 549, 555.1

[56] References Cited

U.S. PATENT DOCUMENTS 3,941,178  3/1976  Simpson et al. ..................... 33/773

FOREIGN PATENT DOCUMENTS

2052066  1/1981  United Kingdom ................... 33/773

*Primary Examiner*—Christopher W. Fulton
*Attorney, Agent, or Firm*—Charles S. McGuire; George R. McGuire

[57] ABSTRACT

Apparatus and method for measuring circumferential surface dimensions of workpieces. A circular table is mounted with its upper surface in a horizontal plane for both rotational and reciprocal vertical movement. A plurality of through slots in the table extend radially with respect to its central axis of rotation. A like plurality of gripper fingers having both vertical and angularly disposed edges are affixed to a common cable for radial movement with respect to the table axis. When the table is in its upper position the fingers are positioned below corresponding ones of the slots, and when in the lower position portions of the fingers extend through the slots. As the fingers are moved toward the workpiece it is engaged by and rides up the angularly disposed edges until it abuts the vertical edges of the fingers. While the workpiece is supported above the table surface, one or more wheels rotatable about vertical axes are moved to engage the surface to be measured. The table is then rotated, with rotation of the workpiece transmitted to the measuring wheel(s) to provide the dimension of the circumference of the workpiece surface.

21 Claims, 9 Drawing Sheets

METHOD AND APPARATUS FOR MEASURING CIRCUMFERENCE OF TIRE BEADS

BACKGROUND OF THE INVENTION

The present invention relates to automated methods and apparatus for measuring the circumference of an annular surface and has particular application to the measurement of the inside and outside circumference dimensions of tire beads.

Many types of vehicle tires include beads surrounding the openings which engage the wheel rim. In general, beads comprise a wire coil in the nature of a hoop formed by winding multiple turns of a coated wire on suitable bead forming apparatus. The bead may have a square or otherwise configured cross section, but in any case has an inside and an outside circumference which may be varied within certain limits by adjustment of the bead forming apparatus.

It is important, of course, that the circumference of the bead be controlled within rather close tolerances. In order to ensure that the bead forming machine is turning out beads having a circumference of the desired dimension, actual measurements of sampled beads are taken. The bead forming machine is appropriately adjusted to remedy any out-of-tolerance condition. In addition to having a high degree of accuracy which is reliably repeatable over a reasonably long period, the measurements should be performed quickly and without undue human intervention.

Accordingly, it is a principal object of the present invention to provide novel and improved methods and apparatus for measuring circumferential surface dimensions, particularly the inside and outside circumferences of a tire bead, characterized by a high degree of accuracy and repeatability, while operating virtually entirely automatically.

Another object is to provide apparatus for measuring the circumference of tire beads, and the like, having novel and improved means for positioning the bead relative to the measuring device.

Other objects will in part be obvious and will in part appear hereinafter.

SUMMARY OF THE INVENTION

The apparatus of the invention includes a table having a horizontal top suitably mounted for rotation about a central, vertical axis, as well as for reciprocal axial (vertical) motion between upper and lower positions. A plurality of elongated slots extend through the table, radially with respect to the central axis. A plurality of elongated arms, corresponding in number to the number of slots, are each mounted below the table, parallel to and in vertical registration with a corresponding slot. Each arm carries an element termed a gripper finger having an upper portion with parallel, vertical edges from which respective edges extend downwardly and outwardly at a horizontal angle of, e.g., 30°. When the table is in its lower position, portions of the gripper fingers extend through the slots, and when in the upper position the gripper fingers are entirely below the upper surface of the table. The gripper fingers are movable along the arms upon which they are mounted in directions parallel to the slots, i.e., radially with respect to the table central axis.

A pair of wheels are mounted upon an arm positioned above and extending across the table. The wheels are rotatable about vertical axes on diametrically opposite sides of the table central axis. The wheels are jointly movable upon the arm toward and away from the central axis,

2 remaining equally spaced therefrom during such movement. The wheels are also movable axially between raised and lowered positions with respect to the upper surface of the table. Rotation of the wheels is digitally recorded to provide a measurement of wheel travel between beginning and ending points. As will be seen, only one wheel is required for implementation of the invention, the second wheel serving as an optional back-up in the event of malfunction or miscalibration of the first.

In operation, an annular, preformed tire bead is placed upon the upper surface of the table, with the latter in its upper position, and the gripper fingers and wheel surfaces positioned radially on opposite sides of the inner and outer circumferential surfaces of the bead. The table is then moved to its lower position, to extend the gripping fingers through the slots with the angled edges of the fingers partly above the upper surface of the table and radially adjacent to the bead. The gripping fingers are then moved simultaneously toward the bead which will ride up the angled edges until meeting the vertical edges of the fingers. At this point the bead is supported by the fingers a short distance above the upper surface of the table and precisely coaxial with the central axis of the table.

The wheels are then moved to their lowered position, placing their peripheries radially adjacent to the bead, on the opposite side from the gripping fingers. Next, the wheels are moved radially until they contact the bead. The table is then rotated, together with the arms upon which the gripping fingers are mounted, thereby rotating the bead about the central axis of the table. The wheels are rotated about their respective axes through frictional contact with the bead. Rotations of the table are counted electronically and mathematically coordinated with digital measurement of wheel travel to provide an extremely accurate indication of bead circumference (inside and/or outside). The sequence of movements of the wheels, gripping fingers, and table are then reversed and the bead removed from the table surface.

The foregoing and other features of the invention will be more readily understood and fully appreciated from the following detailed description, taken in conjunction with the accompanying drawings.

DETAILED DESCRIPTION

Figure 1:
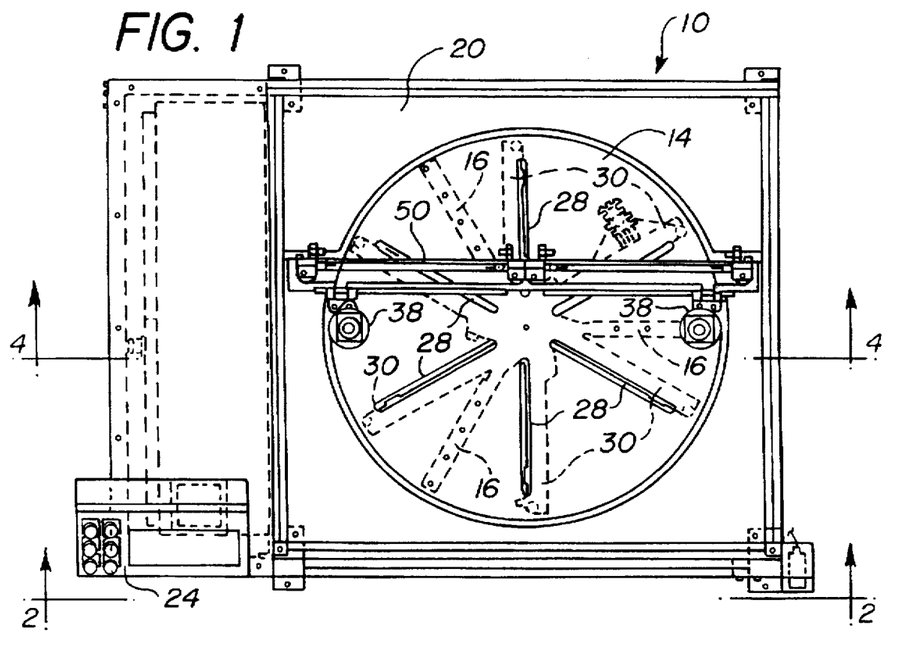
FIG. 1 is a top plan view of the apparatus of the invention.
Figure 2:
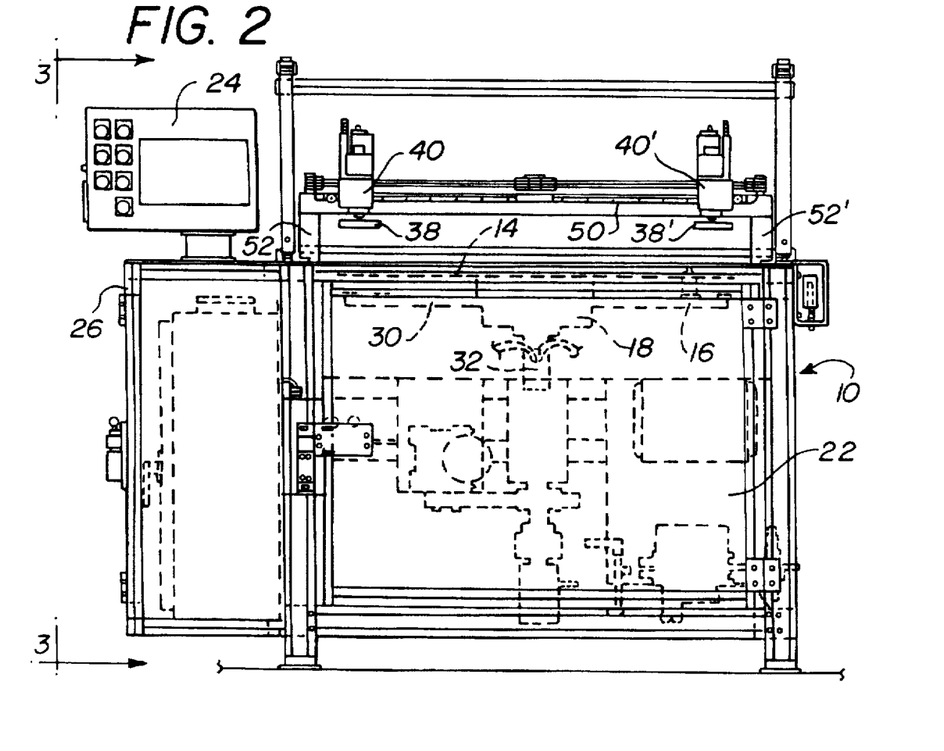
FIG. 2 is a front elevational view as seen from the line 2—2 of FIG. 1.

The apparatus of the invention, denoted generally by reference numeral 10, includes an appropriate, rigid frame with legs 12 resting upon a horizontal surface. Circular table 14 is fixedly attached to a plurality of arms 16, extending radially from hub 18. Table 14 is positioned in a circular opening in stationary plate 20 which is mounted upon the frame. The space below plate 20 is enclosed on all four sides by panels 22 connected to the frame, the panel on what is termed the front side is seen in FIG. 2 and is hinged to the frame to provide access to the enclosed space. Control panel 24 is mounted upon support structure 26 at one side of the frame.

Figure 4:
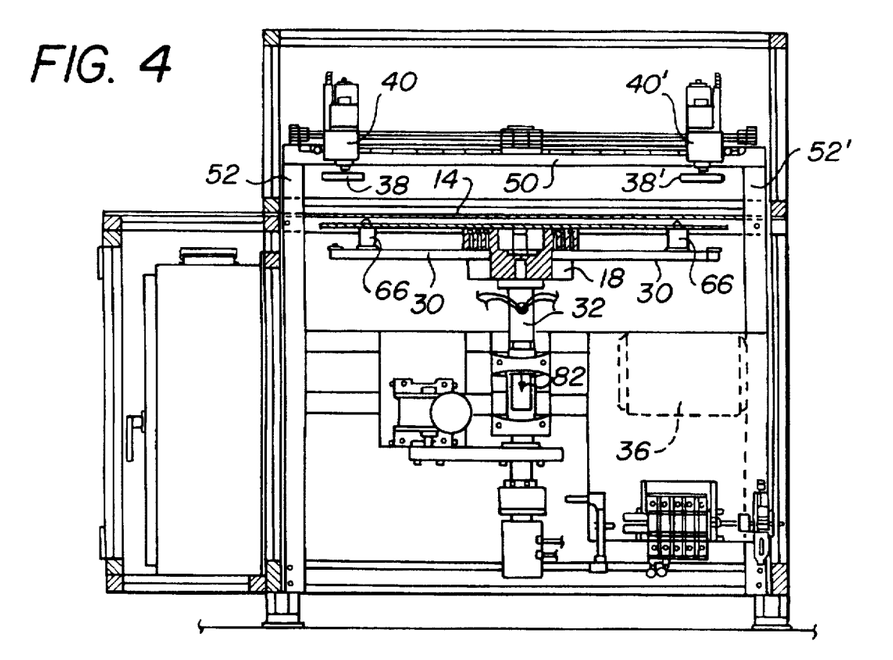
FIG. 4 is a front elevational view in section on the line 4—4 of FIG. 1.

A plurality (six in the illustrated embodiment) of through slots 28 in table 14 extend radially with respect to the central axis thereof. A plurality of arms 30, in addition to table-mounting arms 16, extend radially from hub 18 parallel to and downwardly adjacent each of slots 28. Hub 18 is mounted upon shaft 32 which is vertically reciprocable by pneumatic cylinder 34 to move table 14 between raised and lowered positions while remaining in a horizontal plane. Electric motor 36 is operatively connected through suitable gearing to impart rotation to hub 18, and thereby to table 14.

Figure 5:
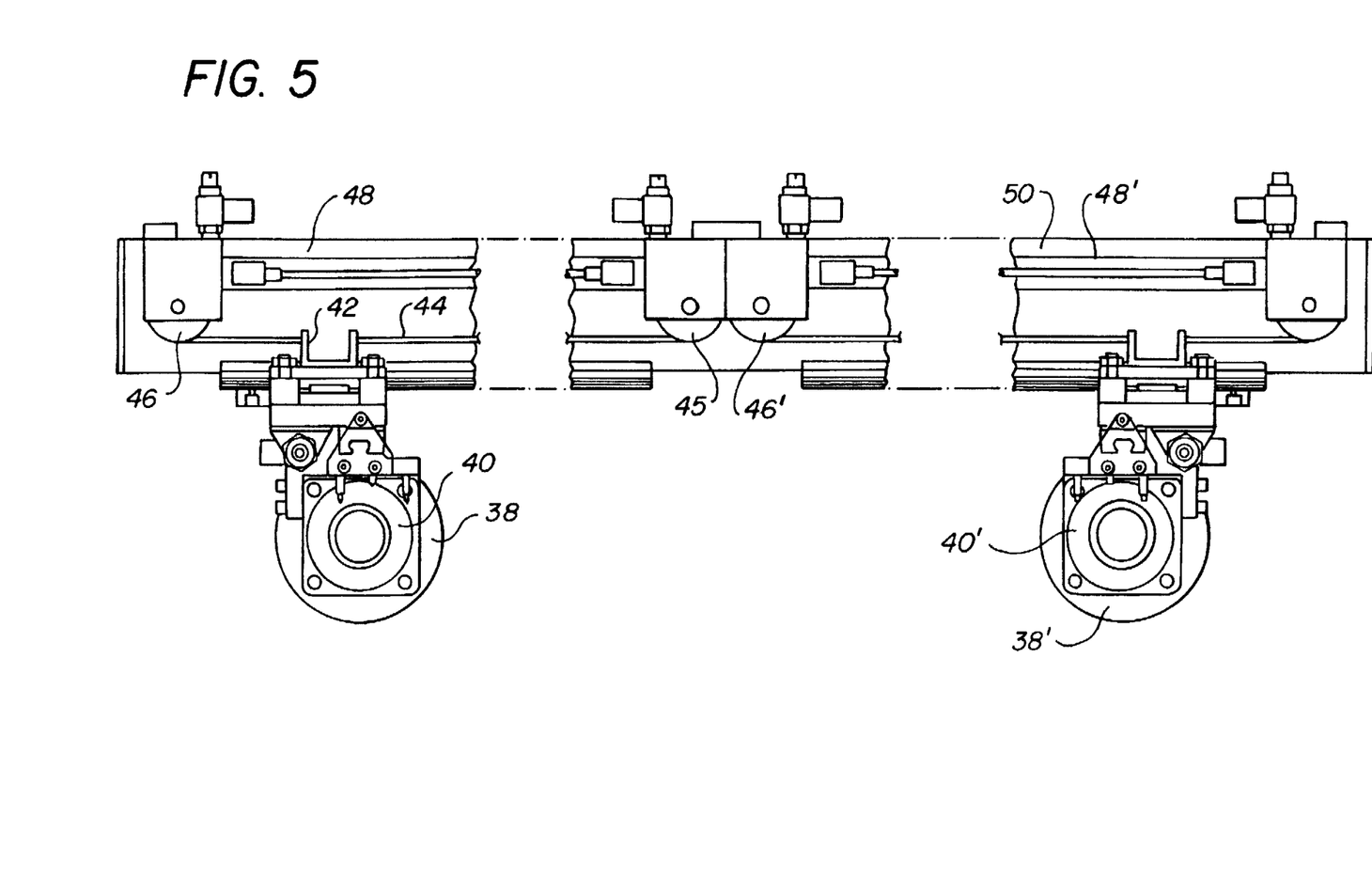
FIG. 5 is an enlarged, top plan view of portions of the apparatus seen in FIG. 1, with parts broken away.
Figure 6:
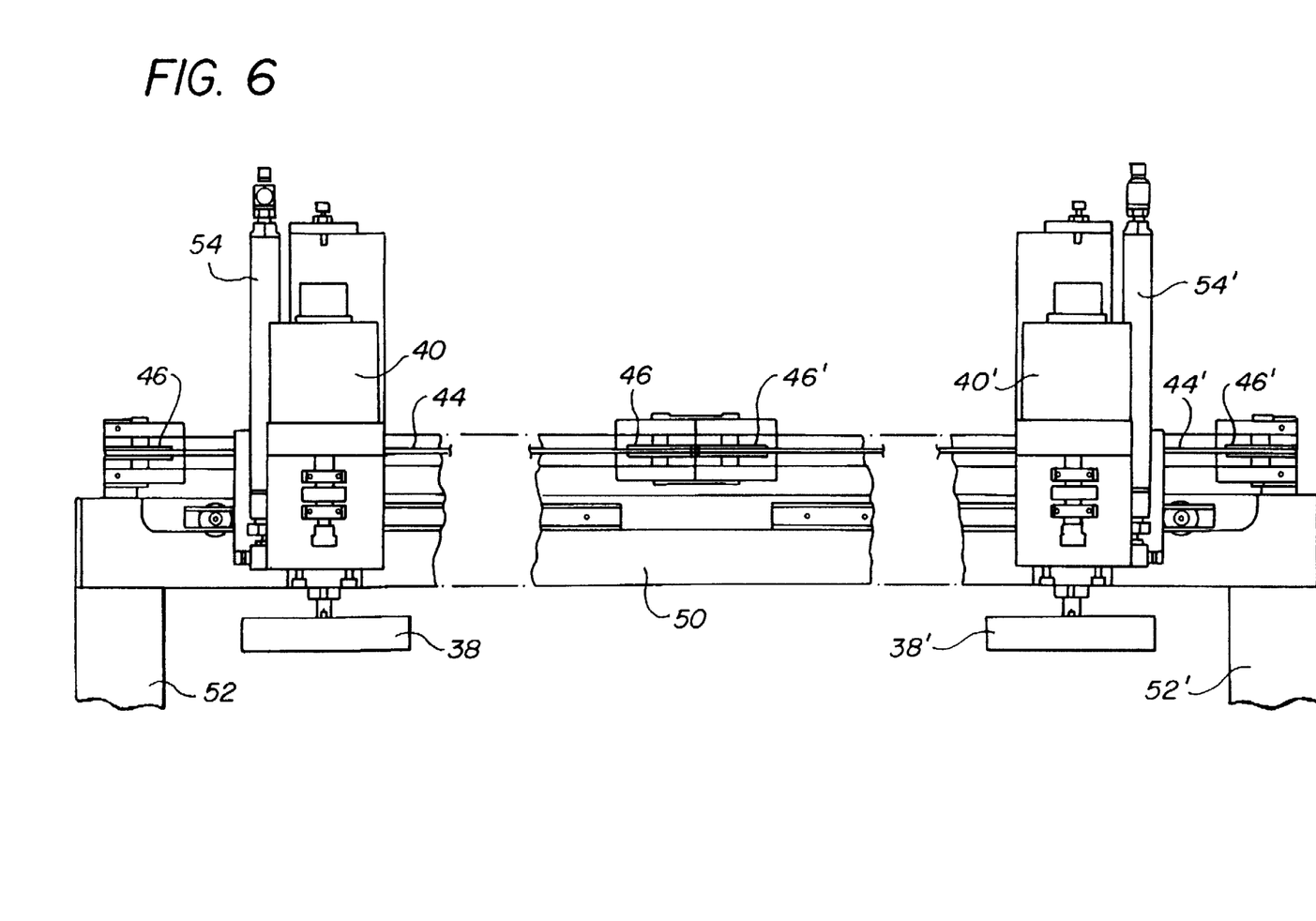
FIGS. 6 and 7 are front and side elevational views, respectively, of the elements of FIG. 5.
Figure 7:
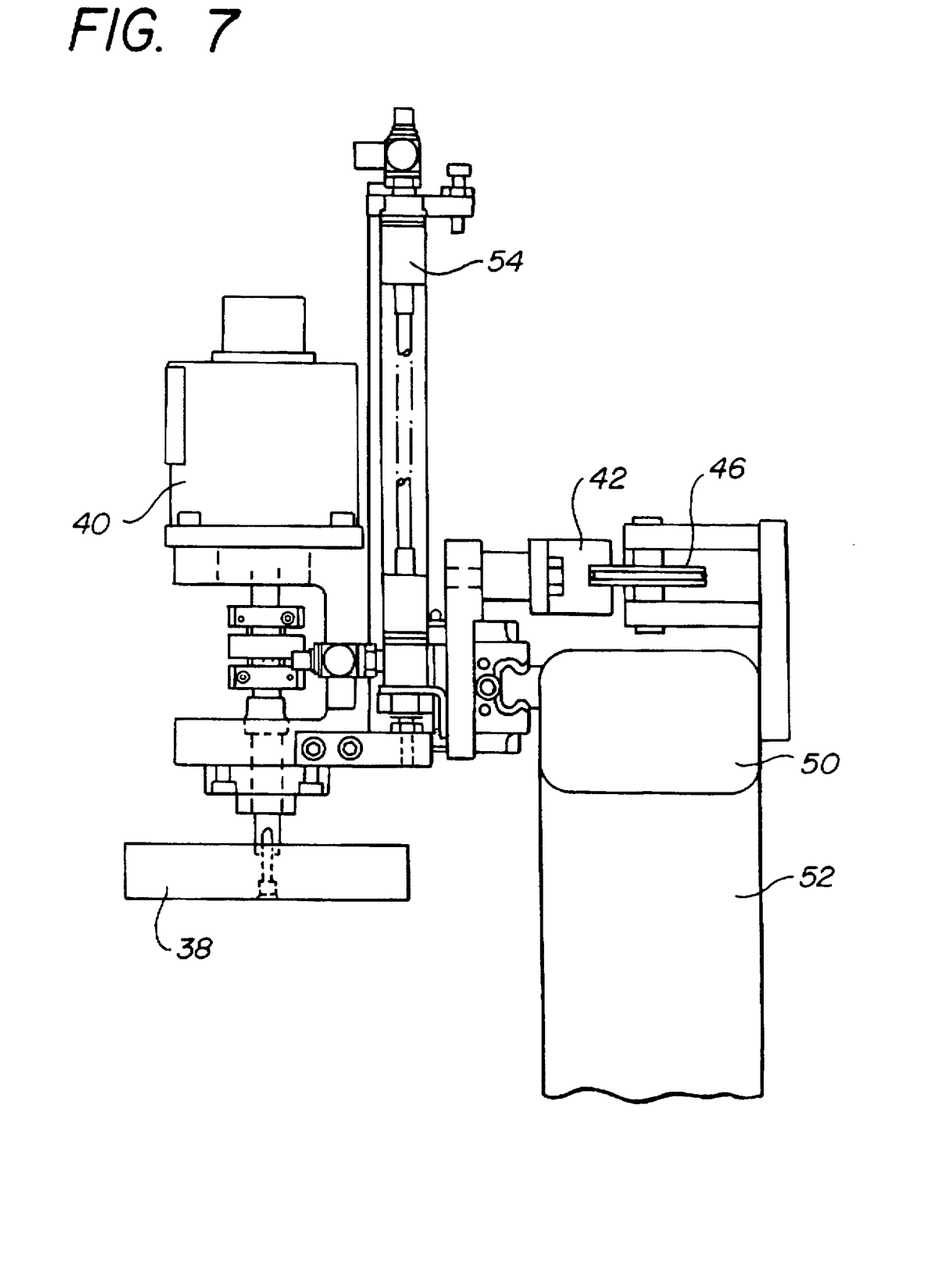

A pair of measuring wheels 38, 38' are mounted upon shafts extending from respective housings 40, 40' for rotation about vertical axes equally spaced from the central axis of table 14. Structure supporting wheels 38, 38' and housings 40, 40' is connected to respective brackets 42, 42', as shown in more detail in FIGS. 5–7. Brackets 42, 42' are fixedly connected to cables 44, 44' which are reciprocally movable about pulleys 46, 46' to move wheels 38, 38' horizontally by equal distances toward and away from the central axis of table 14 by means of pneumatic cylinders 48, 48'. Pulleys 46, 461 and cylinders 48, 48' are mounted upon horizontal arm 50 which is carried by vertical arms 52, 52', affixed to the frame on opposite sides of table 14. In addition to the horizontal movement, wheels 38, 38' are vertically movable toward and away from the upper surface of table 14 by pneumatic cylinders 54, 54'.

Figure 8:
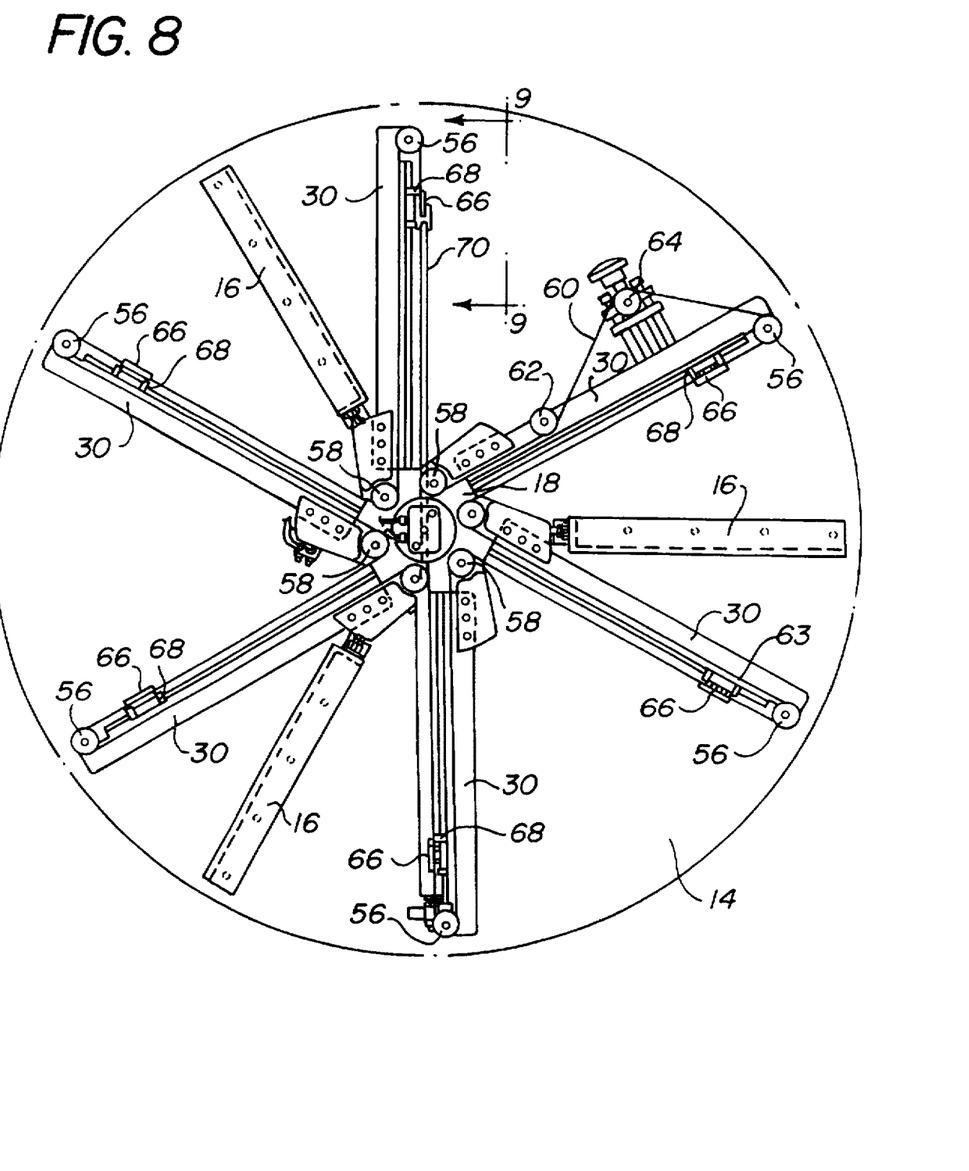
FIG. 8 is a bottom plan view of portions of the apparatus.
Figure 9:
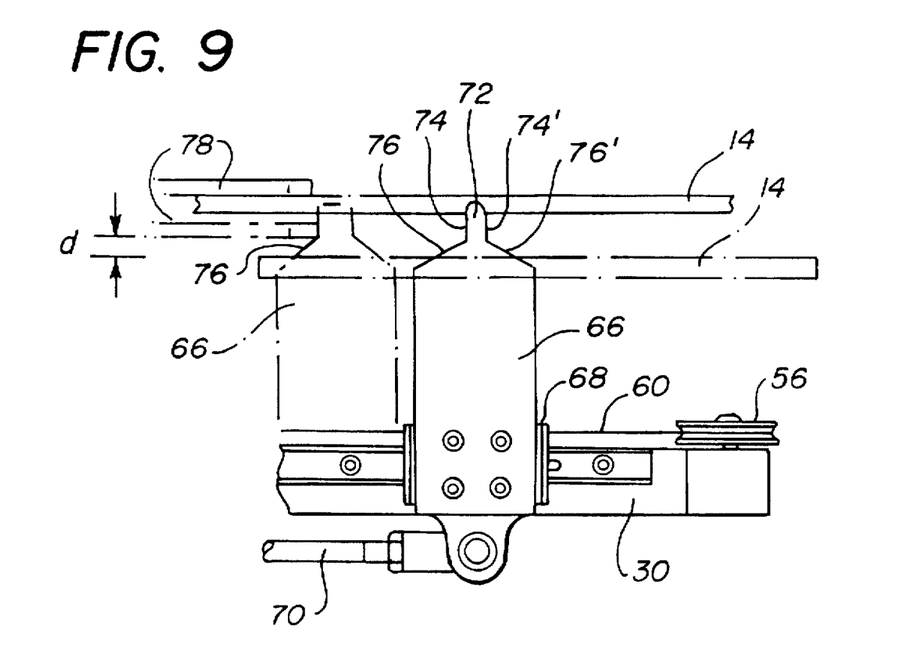
FIG. 9 is a fragmentary, side elevational view in section on the line 9—9 of FIG. 8.
Figure 9A:
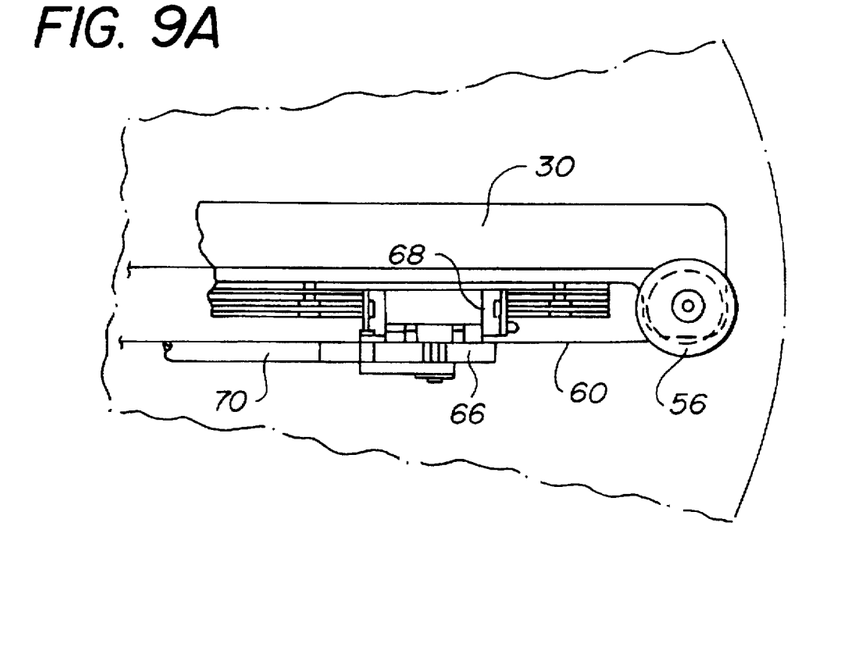
FIG. 9A is a top plan view of the elements shown in FIG. 9.
Figure 10:
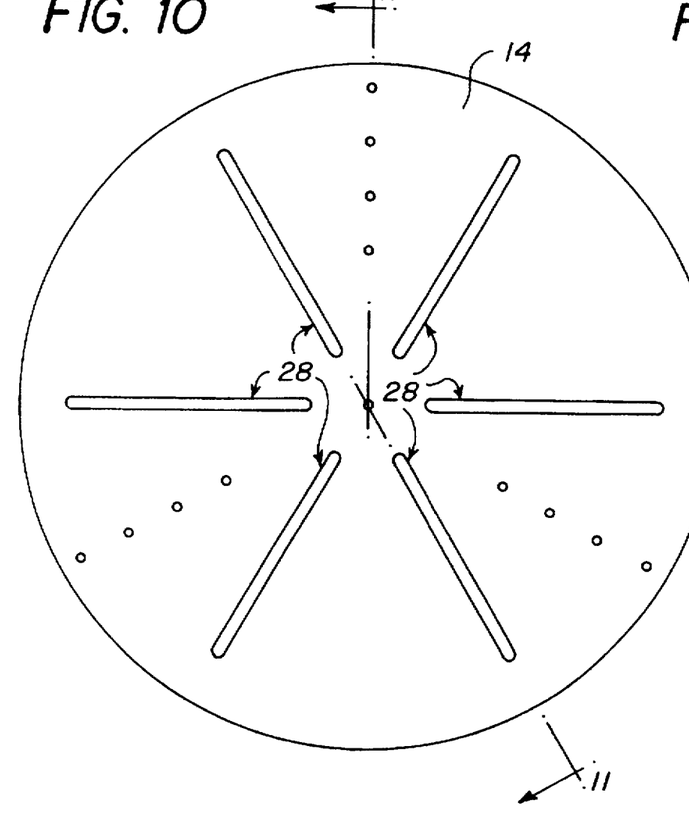
FIG. 10 is a plan view of one element of the apparatus.
Figure 11:
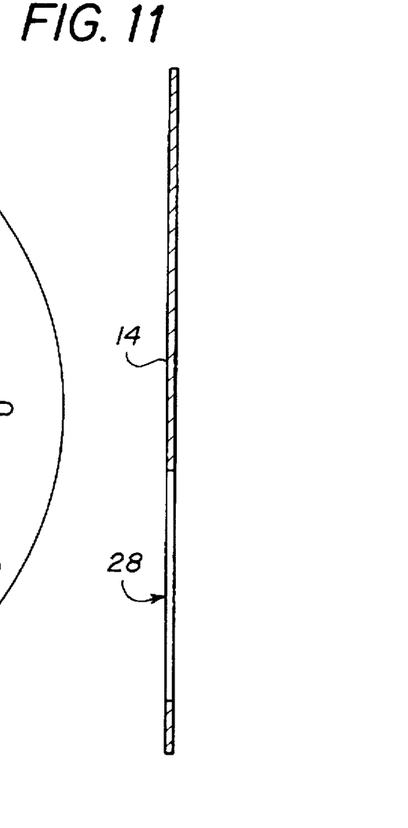
FIG. 11 is an elevational view in section on the line 11—11 of FIG. 10.
Figure 12:
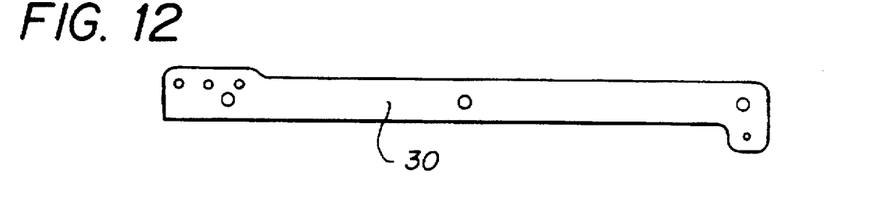
FIGS. 12 and 13 are elevational views of additional elements of the apparatus.
Figure 13:
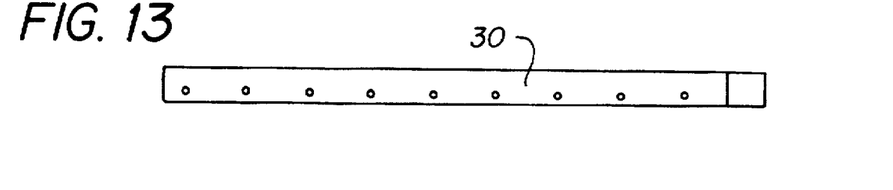
Figure 14:
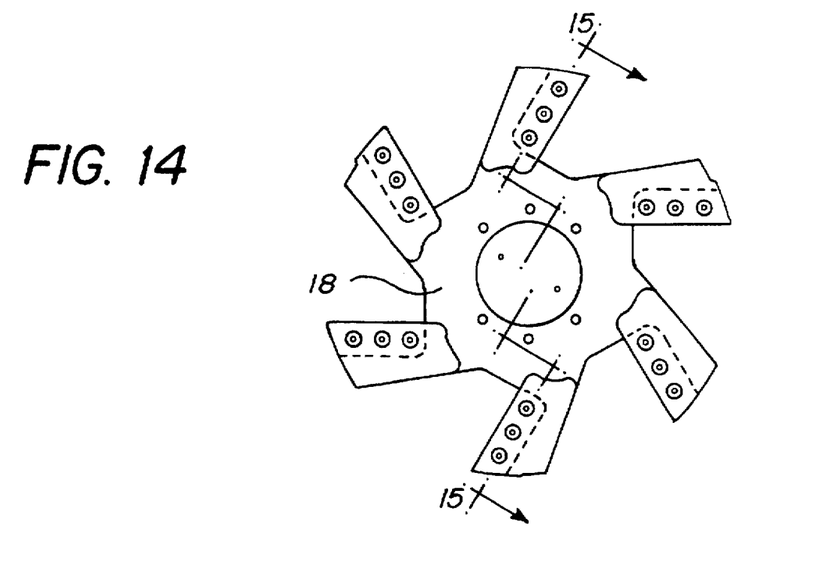
FIG. 14 is a top plan view of another element.
Figure 15:
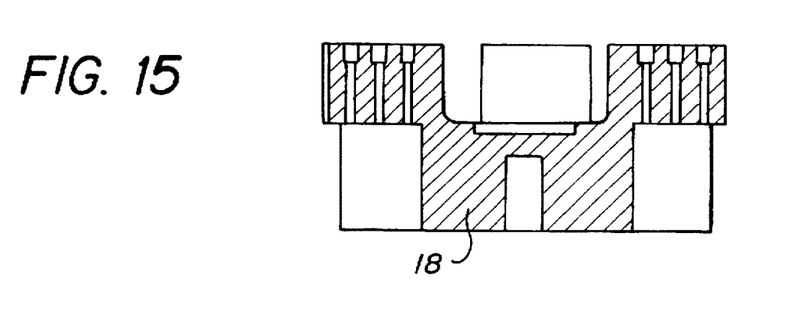
FIG. 15 is an elevational view in section on the line 15—15 of FIG. 14.
Figure 16:
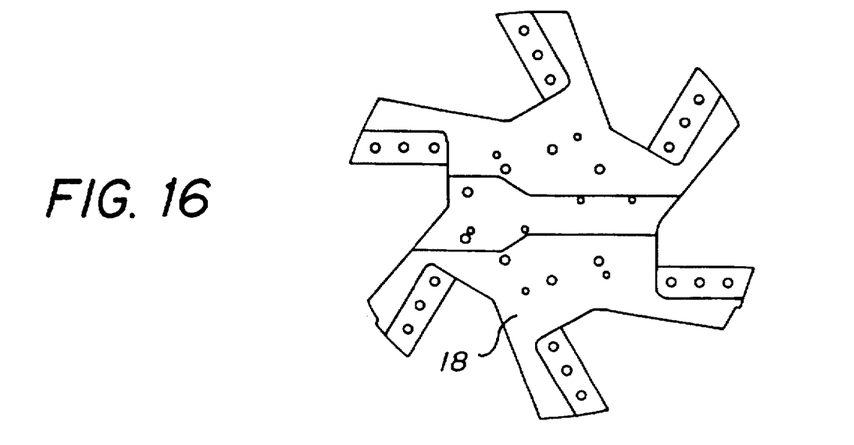
FIG. 16 is a bottom plan view of the element of FIG. 14.

Referring now to FIGS. 8, 9A and 9, a pulley 56 is mounted near the outward end of each of arms 30 and a like number of corresponding pulleys 58 are mounted upon hub 18. Cable 60 extends continuously about pulleys 56 and 58, as well as guide pulley 62 and tension adjustment pulley 64. Gripper fingers 66 are fixedly mounted upon brackets 68, one of which is attached to cable 60 beneath each of slots 28. Operating rod 70 extends from a pneumatic cylinder (not shown) mounted on hub 18 and is connected to one of gripper fingers 66 or its associated bracket 68. Thus, extending and retracting movement of rod 70 is transmitted, through cable 60, to all of brackets 68 and gripper fingers 66. Brackets 68 are attached to cable 60 along each of arms 30 at equal distances from the central axis of table 14. Thus, fingers 66 remain equally spaced from the table axis throughout the range of their radial movement.

As seen in FIG. 9, fingers 66 include upwardly projecting tip 72 having parallel, vertical edges 74, 74'. Extending outwardly and downwardly at an acute angle from edges 74, 74' are edges 76, 76', respectively. As previously mentioned, table 14 is both rotatable and vertically movable between upper and lower positions shown in FIG. 9 in solid and dot-dash lines, respectively. Tire bead 78 is shown in solid lines resting upon the surface of table 14 while the latter is in its upper position. Assuming it is the inner circumference of bead 78 which is to be measured, the bead is placed upon table 14 by an operator (or by automatic handling means) while fingers 66 are positioned radially outwardly of the bead, as shown in solid lines.

Table 14, with bead 78 resting thereon, is then moved to its lower position, whereby portions of fingers 66 extend upwardly through slots 28. Fingers 66 are then moved radially inwardly along slots 28 in the manner previously described. During such movement, from the position of finger 66 shown in solid lines to that shown in dot-dash lines, bead 78 rides up edge 76 until it contacts vertical edge 74. Bead 78 is then supported by fingers 66 above the upper surface of table 14, being spaced therefrom by a distance indicated at "d" in FIG. 9.

The structures carrying measuring wheels 38 are positioned with the wheels above and their peripheries radially inwardly of the inside circumferential surface of bead 78. The wheels are moved downwardly and then outwardly to place their peripheries in contact with the inner surface of bead 78. Table 14 is then rotated, thereby rotating arms 30, fingers 66 and bead 78. The rotation is imparted to wheels 38 through frictional contact of their peripheries with the inside surface of bead 78. Preferably, table 14 is rotated through several revolutions in one direction and is then stopped and rotated several revolutions in the opposite direction.

Figure 3:
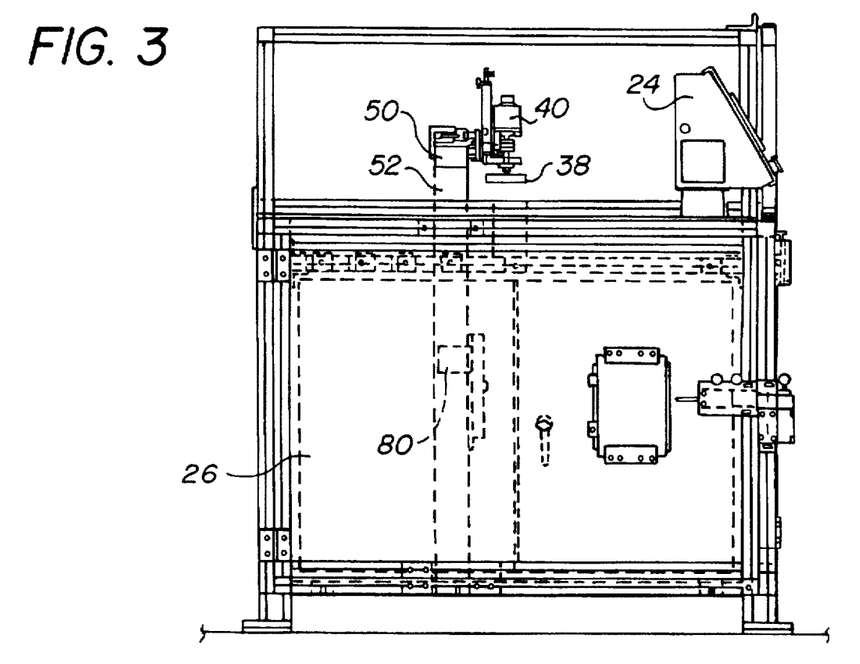
FIG. 3 is a side elevational view as seen from the line 3—3 of FIG. 2.

Travel of the peripheries of wheels 38, 38' is measured by conventional means such as digital electronic encoders within housings 40, 40' and the number of table revolutions is sensed by photodetector 80 (FIG. 3) containing a light source which is directed upon a portion of rotating shaft 32. Slot 82 (FIG. 4), or other means providing an area of different reflectivity than the remainder of the shaft surface, intersects the detector beam at each revolution of the shaft and table, thereby generating electrical signals commensurate with the number of table revolutions. Total wheel travel is then divided by the number of table revolutions to provide a dimension corresponding to the inside circumference of bead 78. Rotating the table in both directions provides the advantage of canceling out any differences possibly caused by which side of the bead is uppermost when it is placed on the table surface.

When the measurement operation is completed and table rotation stopped, wheels 38 are moved inwardly and upwardly, fingers 66 are moved outwardly to release bead 78, and table 14 is moved to its upper position. Bead 78 may then be removed from the table surface and replaced by another bead for the next operation. It is apparent that the outside circumference of a bead may be measured in the same manner by initially positioning fingers 66 inwardly of the bead and moving them outwardly to raise and support the bead by edges 76'. Wheels 38, 38' would, of course, be positioned outwardly of the bead and moved inwardly to contact its outer surface.

Further constructional details of table 14, arms 30 and hub 18 are shown in FIGS. 10–16. A plurality of solenoid-actuated valves 80 are connected to a source of compressed air (not shown) and are responsive to operator actuation of control panel 24 to provide pneumatic operation of cylinders 34, 48, 48', 54, 54', and the cylinder to which rod 70 is attached.

Although the invention has been described in the context of measuring essentially cylindrical surfaces, it is apparent that the degree of roundness, or even of symmetry, is unimportant. Tire beads, although wound on cylindrical forming apparatus, have some degree of flexibility and the inner and outer surfaces are often not perfectly cylindrical. Since gripper fingers 66 are affixed to cable 60 at equal distances from the central axis of table 14, the bead will be urged toward a cylindrical configuration when contacted and supported by the fingers. Portions between points where the bead is engaged by the fingers may still be somewhat out-of-round, but this is of no consequence because the pneumatic cylinders effecting horizontal movement of the measuring wheels yieldingly urges the wheels into contact with the bead surface. That is, the wheels are not held horizontally stationary but rather are movable against the pneumatic biasing force to follow any non-cylindrical irregularities in the bead surface being measured. It is also possible, within the scope of the invention, to affix gripper fingers 66 to cable 60 at unequal spacings from the central axis of table 14 for measurement of the circumference of oval or other non-cylindrical surfaces. In fact, it is not strictly necessary that all of the gripper fingers engage the workpiece as long as it is supported above the table surface. As previously mentioned, only one measuring wheel is required for implementation of the invention; the second wheel and associated structure may be omitted when the added cost thereof does not justify the degree of redundancy afforded thereby.

What is claimed is:

1. Apparatus for measuring the circumference of a workpiece surface having a first axis, said apparatus comprising:
   a) a table having a horizontal, upper surface whereon said workpiece is positioned with said first axis oriented vertically;
   b) workpiece support means;
   c) first means for effecting relative movement of said support means and said upper surface between a first position, wherein said support means is spaced from said workpiece, and a second position, wherein said support means contact and support said workpiece in a position spaced vertically above said horizontal surface;
   d) at least one wheel having a peripheral surface rotatable about a second, vertical axis, spaced from said first axis;
   e) second means for effecting relative, horizontal movement of said wheel and said workpiece between first and second positions wherein said peripheral surface is spaced from and in frictional contact with said cylindrical surface, respectively;
   f) third means for effecting relative rotation of said workpiece and said wheel about said first axis, whereby, when said wheel and workpiece are in said second position thereof, said frictional contact causes rotation of said wheel about said second axis; and
   g) fourth means for measuring the rotational travel of said wheel peripheral surface about said second axis in relation to said relative rotation about said first axis.

2. The apparatus of claim 1 wherein said table is round, having a third, central axis, and further including fifth means for effecting rotation of said table about said third axis.

3. The apparatus of claim 2 wherein said support means is rotatable with said table, thereby rotating a workpiece supported by said support means.

4. The apparatus of claim 3 wherein said table includes a plurality of open, elongated slots extending through said upper surface radially of said third axis, said support means comprise a plurality of individual support members positioned to extend at least partially through said slots, and said first means comprises motive means for moving said support members reciprocally along said slots.

5. The apparatus of claim 4 wherein said slots are linear and said support members are at least three in number.

6. The apparatus of claim 5 wherein each of said support members includes a linear edge portion arranged at an acute angle to said upper surface and stop means at the upper end of said edge portion, whereby as said support members are moved along said slots said workpiece rides up said edge portions until contacting said stop means.

7. The apparatus of claim 6 wherein said stop means comprises vertically oriented portions of said support members extending upwardly from said edge portions.

8. Apparatus for measuring a circumferential dimension of a workpiece surface, said apparatus comprising:
   a) a table having a substantially horizontal, upper surface for supporting said workpiece with the longitudinal axis of said surface vertically oriented;
   b) support means movable with respect to said horizontal surface to engage a workpiece upon said horizontal surface and to support said workpiece in vertically spaced relation above said horizontal surface with said longitudinal axis remaining vertically oriented;
   c) first means for effecting rotational movement of said workpiece about said longitudinal axis;
   d) second means for measuring the distance traveled by a fixed point on said workpiece surface over at least a portion of said rotational movement; and
   e) third means for measuring the number of rotations of said object during said portion of said rotational movement, whereby the measurements of said first and second measuring means provide a measurement of said circumference.

9. The apparatus of claim 8 wherein said table is circular and has a diameter larger than the largest cross dimension of said workpiece surface.

10. The apparatus of claim 8 wherein said first measuring means comprise a wheel rotatable about an axis parallel to and laterally spaced from said longitudinal axis and having an outer periphery in frictional contact with said workpiece surface for rotation of said wheel in response to rotation of said workpiece surface.

11. The apparatus of claim 8 wherein said second measuring means comprises photoelectric means for detecting revolutions of said workpiece surface.

12. The apparatus of claim 8 wherein said support means comprise a plurality of support members jointly movable in respective radial directions with respect to said longitudinal axis.

13. The apparatus of claim 8 and further including means for effecting relative vertical movement of said support means and said horizontal surface.

14. The apparatus of claim 13 wherein said means for effecting relative vertical movement comprises means for moving said table between upper and lower positions.

15. The apparatus of claim 14 wherein said table includes a plurality of through, elongated slots extending radially with respect to the center of said table, and said support means comprise a plurality of support members positioned entirely below said horizontal surface when said table is in said upper position and extending at least partially through said slots when said table is in said lower position.

16. The apparatus of claim 15 and further including means for effecting simultaneous movement of each of said support members by equal distances along said slots.

17. A method of measuring the circumference of a workpiece surface comprising the steps of:

a) supporting a table with an upper surface thereof in a horizontal plane;

b) placing a workpiece having a surface surrounding a first axis upon said upper surface with said first axis vertically oriented;

c) contacting said workpiece by support means;

d) effecting relative vertical movement of said upper surface and said support means to position said workpiece above said upper surface;

e) supporting a wheel having a peripheral surface for rotation about a second axis, parallel with and spaced from said first axis, with said peripheral surface in frictional contact with said workpiece surface;

f) effecting relative rotation of said wheel and said workpiece about said first axis, whereby said frictional contact causes rotation of said wheel about said second axis; and g) measuring the relative rotational travel of said peripheral surface and said workpiece surface to provide measurement of said workpiece surface circumference.

18. The method of claim 17 wherein said table is round and has a central axis, said workpiece being supported by said support means with said first axis substantially coaxial with said central axis.

19. The method of claim 18 wherein said relative rotation about said first axis is effected by rotating said table, and thereby said workpiece, about said central axis.

20. The method of claim 19 wherein said relative vertical movement is effected by moving said table between upper and lower positions.

21. The method of claim 20 wherein said support means comprise a plurality of support members and said contacting of said workpiece by said support means is effected by moving said support members radially toward said workpiece while said table is in said lower position.

* * * * *